Patented Jan. 26, 1943

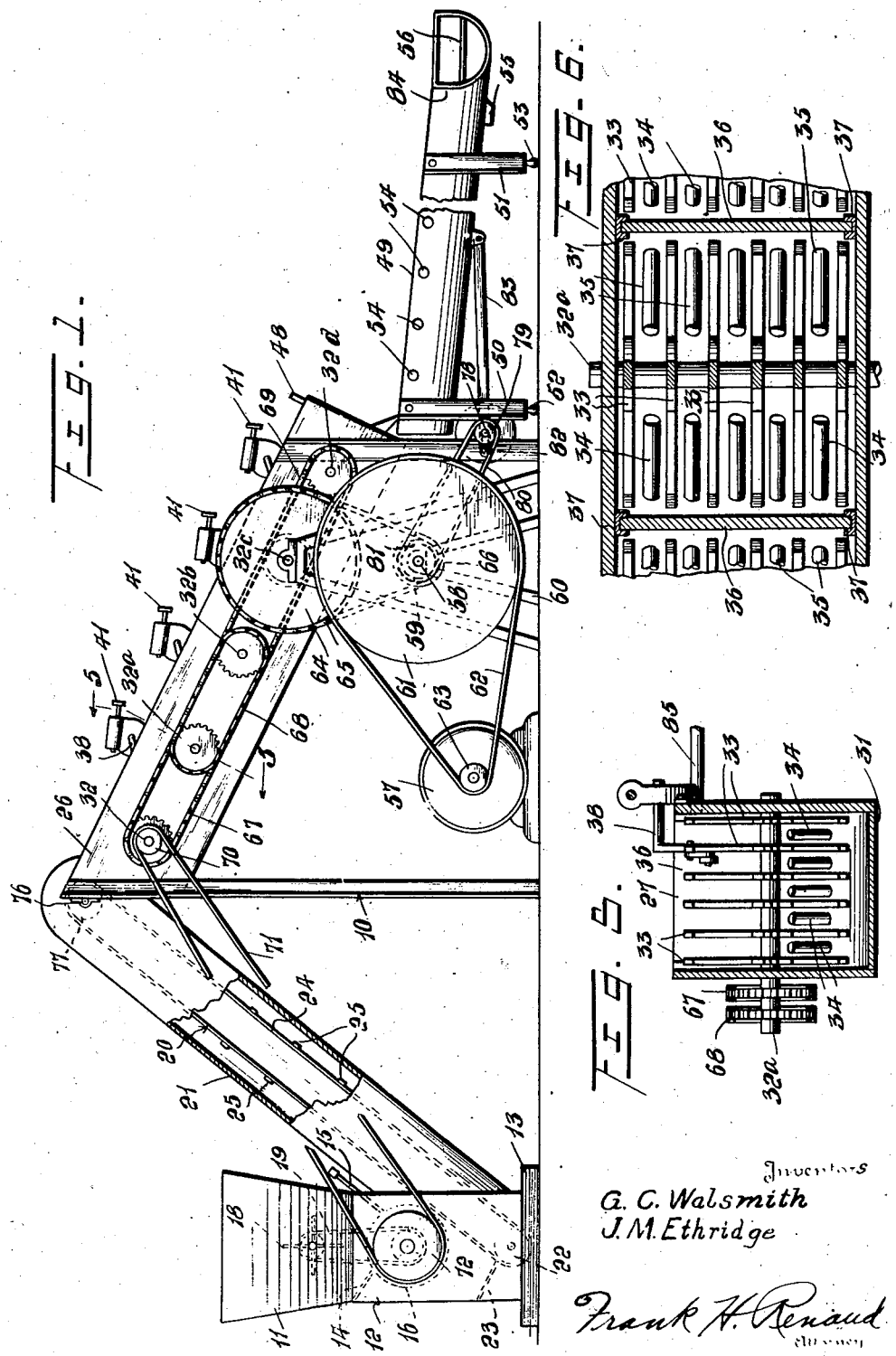

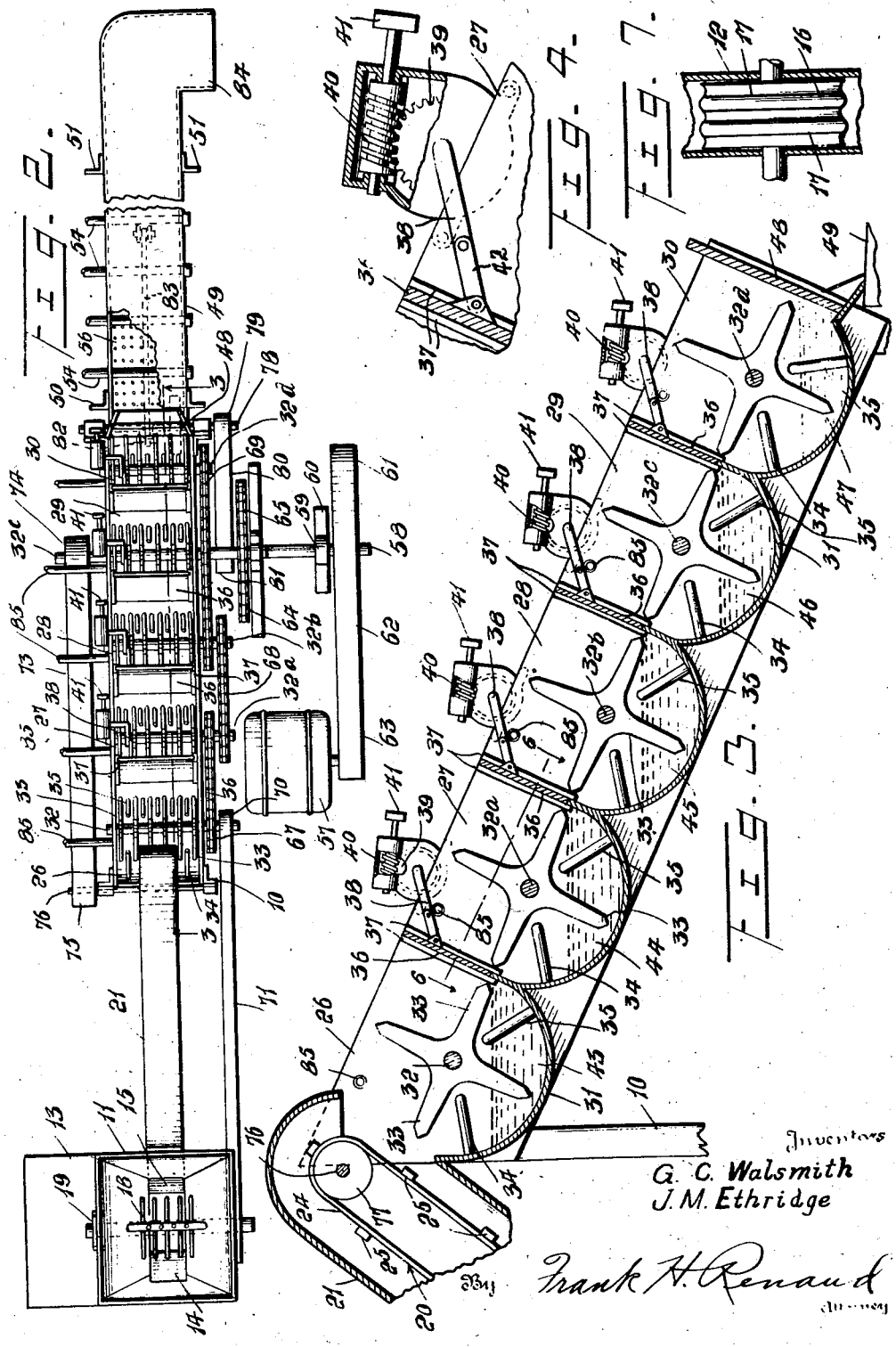

2,309,423

UNITED STATES PATENT OFFICE 2,309,423

COTTONSEED DELINTING MACHINE

Grover C. Walsmith, Blanco, Tex., and James M. Ethridge, Anthony, N. Mex.

Application February 24, 1940, Serial No. 320,652

5 Claims. (Cl. 83—27)

This invention relates to seed treating machines.

An object of this invention is to provide an improved means for treating of cotton seeds for the purpose of assisting in the germination thereof and to remove disease germs adhering to the exterior of the seeds.

Another object of this invention is in the provision of means for removing the lint or other particles, including germs, from the exterior of the seeds, the seeds progressing through different treatment zones or chambers and finally emerging as a thoroughly cleansed seed which is free from disease germs on the hull thereof and is capable of germinating quickly and with much less moisture than seeds treated in other ways.

Still another object of this invention includes the treatment of seeds with relatively hot sulphuric acid, the seeds being initially discharged into a chamber containing substantially undiluted hot sulphuric acid, and then passing through a series of chambers containing sulphuric acid of varying degrees of dilution, and finally emerging as seeds thoroughly cleaned of acid, lint and disease germs.

With the foregoing and other objects in view, the invention will be more fully described hereinafter, and will be more particularly pointed out in the claims appended hereto.

In the drawings, wherein like symbols refer to like or corresponding parts throughout the several views;

Figure 1 is a detail side elevation, partly broken away and in section, of a seed delinting means constructed according to an embodiment of this invention.

Figure 2 is a detail top plan of the machine.

Figure 3 is an enlarged sectional view taken on the line 3—3 of Fig. 2.

Figure 4 is an enlarged sectional view of one of the valves or gates and the operating means therefor.

Figure 5 is a transverse sectional view through one of the chambers.

Figure 6 is an enlarged sectional view taken on the line 6—6 of Fig. 3.

Figure 7 is a fragmentary vertical sectional view partly in elevation of the seed spreading means below the receiving hopper.

Referring to the drawings, the numeral 10 designates generally a frame structure constructed of suitable material and which is adapted to support the seed treatment means hereinafter described.

A hopper 11 extends upwardly of a housing 12 secured to a base 13, and the hopper 11 is designed to receive the untreated seeds. The hopper 11 is provided with a pair of downwardly convergent bottom walls 14 and 15, the wall 15 being slidably mounted in the upper end of the housing 12, and this wall 15 projects outwardly of the housing 12 and constitutes an adjustable feeding means to regulate the feeding of the seeds from the hopper 11. A distributing and rotatable drum 16 is journalled within the housing 12 beneath the bottom walls 14 and 15, and the peripheral surface of the drum 16 is provided with corrugations 17 which assist in the distribution of the seeds. The valve or wall member 15 is movable toward or away from the drum 16 and thereby regulates the quantity of seeds passing downwardly into the housing 12.

The hopper 11 is provided with an agitator 18 which is journalled in the hopper 11 and is rotated by means of a belt 19 or like drive means connected to the shaft of the drum 16. An endless conveyor 20 is disposed in a housing 21 which extends upwardly from the lower portion of the housing 12, the conveyor 20 being trained over an idler roller 22 which is journalled in the lower portion of the housing 12 beneath the distributing drum 16. An inner bottom wall 23 is mounted in the housing 12 and has its inner edge disposed closely adjacent to the lower end of the upper run of the conveyor 20. The conveyor 20 comprises a flexible endless belt 24 having slats 25 extending transversely thereacross which are adapted to carry the untreated seeds upwardly in the housing 21. The upper end of the housing 21 is secured to the frame 10 and the conveyor 20 discharges the seeds into an initial treatment chamber 26. Additional treatment chambers 27, 28, 29 and 30 are disposed in side-by-side relation and downwardly inclined or stepped relation.

The treatment chambers 26, 27, 28 and 29 are similar in every detail and the description of one of these chambers will apply equally as well to the other chambers. The chamber 26 comprises a body provided with a curved bottom wall 31, and a shaft 32 is journalled across the chamber. A plurality of seed agitating blades 33 are secured to the shaft 32 in spaced apart relation, and a plurality of tines 34 and 35 are secured to the bottom wall 31 and engage between the blades 33. The tines 34 and 35 are disposed in radial relation to the shaft 32 and are positioned below the center thereof.

A movable partition or wall 36 is disposed between the chambers 26 and 27, being slidably mounted in guides 37 carried by the end walls of the chambers 26 and 27. The gate or slide 36 is operated by means of a bell crank 38 secured to a worm gear 39 which is rotated by a worm 40 having a handle 41 connected thereto. The bell crank 38 is connected to the gate 36 by a link 42 which is pivoted at one end to the crank 38 and at the other end to the gate 36.

The first treatment chamber 26 is adapted to contain a liquid in the form of sulphuric acid 43, the acid 43 being preferably undiluted and heated to a relatively high degree so as to facilitate the removal of lint and other particles, including disease germs from the hulls of the seeds. The chamber 27 is adapted to contain a liquid including sulphuric acid and water, as at 44, the chamber 28 having a liquid 45 therein which is diluted to a greater extent than the liquid 44, and the chamber 29 having a liquid 46 therein which is diluted to a greater extent than the liquid 45. The chamber 30 is adapted to contain clear water and comprises a rinsing chamber for removing the acid from the seeds.

The seeds are adapted to progress from one chamber to the other upon opening of the gate 36 between each pair of chambers. The last or rinsing chamber 30 is provided with a slidable gate 48 which may be operated in the same manner as the gates 36, or may be operated by merely grasping the upper edge thereof with the hands and pulling the gate 48 to the desired open position.

After passing through the rinsing chamber 30 the seeds are discharged onto a chute or trough 49 which is mounted on legs 50 and 51. The legs 50 are provided at their lower ends with rollers 52, and the legs 51 are provided at their lower ends with rollers 53. A plurality of spray members 54 are mounted transversely across the trough 49, and these spray members 54 are adapted to spray water upon the seeds discharged into the trough 49. The trough 49 is inclined downwardly from the rinsing chamber 30, and adjacent the lower end thereof is provided with a water outlet 55. A perforate wall 56 is mounted in the trough 49 above the bottom thereof, and the seeds are adapted to move along this wall 56 for discharge at the lower open end of the trough 49.

A motor or power member 57 may be mounted at any suitable point with respect to the frame 10 and constitutes the sole driving means for the various rotatable members and oscillatable members hereinbefore described. A shaft 58 is journalled in bearings 59 carried by frame members 60. A relatively large pulley or wheel 61 is secured to the shaft 58, and a belt 62 is trained over this pulley 61 and also over a pulley 63 carried by the motor 57. A sprocket or pulley 64 is secured to the shaft of the agitating means within the chamber 29, and a chain or flexible driving means 65 is trained over the sprocket 64 and over a relatively small sprocket or pulley 66 secured to the shaft 58. The agitator shafts 32 of the chambers 26, 27, 28, 29, and 30 are rotated by means of endless chains 67, 68, 69, respectively, which engage sprockets carried by the respective shafts 32 of each chamber.

The upper shaft 32 has a pulley 70 secured thereto over which a belt or flexible member 71 is trained, the belt 71 also engaging over a pulley 72 secured to the shaft of the drum 16. The conveyor 20 is operated from a belt 73 which engages a pulley 74 secured to shaft 32c upon which the sprocket 64 is mounted, and also engages over a pulley 75 carried by a shaft 76 upon which a driving roller 77 is mounted.

A shaft 78 is journalled in the forward end of the frame 10, and has a pulley 79 secured thereto. A belt 80 engages over the pulley 79, and also over a pulley 81 secured to the shaft 58. An eccentric or crank 82 is carried by the shaft 78, and a pitman or link 83 is secured at one end to the eccentric or crank 82 and at the other end to the trough 49, so that this trough 49 will be oscillated in order to advance the seeds along the perforate wall 56. The rollers 52 and 53 permit the free oscillation or reciprocation of the trough 49 upon a plane surface. As will be noted from Figure 2, the trough 49 is provided with a laterally projecting discharge spout 84 so that the cleaned seeds which are still moist may be discharged onto a suitable conveyor (not shown) and then taken to a drier.

In the use and operation of this device, the untreated cotton seeds which contain lint and other particles, including disease germs on the exterior thereof, are first discharged into the hopper 11. The agitating member 18 will prevent packing of the seeds in the hopper 11 and permit the easy movement of the seeds toward the bottom members 14 and 15. The drum 16 closes the space between the convergent ends of the bottom members 14 and 15, and rotation of the drum 16 will effect discharge of seeds onto the conveyor 20, the upper run of which is moving upwardly.

The untreated seeds are discharged by the conveyor 20 into the first treatment chamber 26, the gate 36 of which is kept closed for the desired length of time. The hot sulphuric acid 43 is discharged into the chamber 26 through a pipe 85, and the level of the acid is substantially at the bottom of the gate 36 so that when this gate is opened the undiluted acid in chamber 26 will not flow to chamber 27.

The agitating blades 33 in chamber 26 will constantly agitate the seeds in this chamber, and when the gate 36 is opened the seeds will be crowded or forced from chamber 26 to chamber 27 which contains sulphuric acid which is slightly diluted with water.

As each succeeding gate 36 is opened the treated seeds progress to succeeding chambers, and are finally discharged into the trough 49 which is constantly agitated or oscillated by means of the eccentric 82. As the seeds progress downwardly in the trough 49 along the perforate bottom 56 they are sprayed with clean water from the spray members 54, and are finally discharged through the spout 84 onto a suitable conveyor and transferred to a drying device (not shown).

What is claimed is:

1. A seed delinting means comprising a plurality of liquid chambers disposed in side abutting relation, means supporting said chambers on an inclination to the horizontal, means for agitating the seeds in each of said chambers, a hopper, a conveyor for discharging seeds into the uppermost of said chambers, and manually operable valve means between said chambers, said valve means including a valve plate, guide means for said plate, and an individual operator for each plate.

2. A seed delinting device comprising a plurality of liquid receiving chambers disposed in sidewise abutting relation and in alignment and at an inclination to the vertical, means for discharging seeds into the uppermost of said chambers, each chamber including an arcuate bottom wall, adjacent bottom walls merging into each other, a common partition between each pair of chambers, guide means slidably supporting said partitions on an inclination to the vertical and opposite from the inclination of said chambers, means for raising and lowering said partitions, and means for agitating the seeds in said chambers, the mergence of said bottom walls being of such height that the seeds in a preceding upper chamber will be discharged into a succeeding lower chamber upon agitation of the seeds in said preceding upper chamber when the partition between said preceding and succeeding chambers is in an open position.

3. A seed delinting device comprising a plurality of liquid receiving chambers disposed in sidewise abutting relation and in alignment and at an inclination to the vertical, means for discharging seeds into the uppermost of said chambers, each chamber including an arcuate bottom wall, adjacent bottom walls merging into each other, a common partition between each pair of chambers, guide means slidably supporting said partitions on an inclination to the vertical and opposite from the inclination of said chambers, means for raising and lowering said partitions, means for agitating the seeds in said chambers, the mergence of said bottom walls being of such height that the seeds in a preceding upper chamber will be discharged into a succeeding lower chamber upon agitation of the seeds in said preceding upper chamber when the partition between said preceding and succeeding chambers is in an open position, said agitating means including a plurality of spaced apart rotatable bladed elements.

4. A seed delinting device comprising a plurality of liquid receiving chambers disposed in sidewise abutting relation and in alignment and at an inclination to the vertical, means for discharging seeds into the uppermost of said chambers, each chamber including an arcuate bottom wall, adjacent bottom walls merging into each other, a common partition between each pair of chambers, guide means slidably supporting said partitions on an inclination to the vertical and opposite from the inclination of said chambers, means for raising and lowering said partitions, means for agitating the seeds in said chambers, the mergence of said bottom walls being of such height that the seeds in a preceding upper chamber will be discharged into a succeeding lower chamber upon agitation of the seeds in said preceding upper chamber when the partition between said preceding and succeeding chambers is in an open position, said agitating means including a plurality of spaced apart rotatable bladed elements, and opposed pairs of upwardly convergent seed retarding members fixed to each bottom wall and engaging between said bladed elements.

5. A seed delinting device comprising a plurality of liquid receiving chambers disposed in sidewise abutting relation and in alignment and at an inclination to the vertical, means for discharging seeds into the uppermost of said chambers, each chamber including an arcuate bottom wall, adjacent bottom walls merging into each other, a common partition between each pair of chambers, guide means slidably supporting said partitions on an inclination to the vertical and opposite from the inclination of said chambers, means for raising and lowering said partitions, means for agitating the seeds in said chambers, the mergence of said bottom walls being of such height that the seeds in a preceding upper chamber will be discharged into a succeeding lower chamber upon agitation of the seeds in said preceding upper chamber when the partition between said preceding and succeeding chambers is in an open position, said agitating means including a plurality of spaced apart bladed elements, and means for rotating said bladed elements.

GROVER C. WALSMITH.
JAMES M. ETHRIDGE.